United States Patent
Negri

(10) Patent No.: US 12,455,311 B2
(45) Date of Patent: Oct. 28, 2025

(54) METHOD FOR PARTIAL DISCHARGE RECOGNITION IN HIGH VOLTAGE APPLICATIONS AND UNIT USING THE METHOD

(71) Applicant: HSP Hochspannungsgeräte GmbH, Troisdorf (DE)

(72) Inventor: Fabrizio Negri, Nuremberg (DE)

(73) Assignee: HSP Hochspannungsgeräte GmbH, Troisdorf (DE)

( * ) Notice: Subject to any disclaimer, the term of this patent is extended or adjusted under 35 U.S.C. 154(b) by 207 days.

(21) Appl. No.: 18/015,400

(22) PCT Filed: Jul. 17, 2020

(86) PCT No.: PCT/EP2020/070370
§ 371 (c)(1),
(2) Date: Jan. 10, 2023

(87) PCT Pub. No.: WO2022/012761
PCT Pub. Date: Jan. 20, 2022

(65) Prior Publication Data
US 2023/0258706 A1    Aug. 17, 2023

(51) Int. Cl.
| | | |
|---|---|---|
| *G01R 31/12* | (2020.01) | |
| *G01R 23/167* | (2006.01) | |
| *G01R 31/62* | (2020.01) | |
| *G08B 29/06* | (2006.01) | |
| *H01H 9/50* | (2006.01) | |

(52) U.S. Cl.
CPC ....... *G01R 31/1272* (2013.01); *G01R 23/167* (2013.01); *G01R 31/62* (2020.01); *G08B 29/06* (2013.01); *H01H 9/50* (2013.01)

(58) Field of Classification Search
CPC ...... G01R 23/167; G01R 31/12; G01R 31/62; G01R 23/165; G01R 31/1272; G08B 29/06; H01H 9/50
USPC ......................................................... 324/536
See application file for complete search history.

(56) References Cited

U.S. PATENT DOCUMENTS

2006/0139031 A1    6/2006  Kalokitis
2009/0012727 A1    1/2009  Siew

FOREIGN PATENT DOCUMENTS

| CN | 110600247 A | * 12/2019 | ............. H01F 27/02 |
| DE | 102018215610 A1 | * 3/2020 | ........... H01F 27/402 |
| JP | 2020046202 A | 3/2020 | |
| KR | 101552999 B1 | * 10/2015 | ............. G01R 31/12 |

(Continued)

OTHER PUBLICATIONS

English translation of DE102018215610A1 (Year: 2020).*

(Continued)

*Primary Examiner* — Nasima Monsur
*Assistant Examiner* — Courtney G McDonnough
(74) *Attorney, Agent, or Firm* — David R. Stevens; Stevens Law Group

(57) ABSTRACT

A method for partial discharge recognition in high voltage applications and a high voltage unit using the method, includes the steps of detecting a signal, transforming the signal from time to frequency domain, cutting frequencies above a defined threshold, and retransform the truncated signal from frequency to time domain. The information content of detected and truncated signals is determined and compared.

18 Claims, 1 Drawing Sheet

(56) References Cited

FOREIGN PATENT DOCUMENTS

WO           2006071572 A2     7/2006
WO    WO-2008150136 A1 * 12/2008   .......... G01R 19/145

OTHER PUBLICATIONS

English translation of CN 110600247 A (Year: 2019).*
English translation of JP2020046202A (Year: 2020).*
Epacenet English translation KR 101552999 B1 (Year: 2015).*
PCT International Search Report and Written Opinion of International Searching Authority mailed Mar. 11, 2021 corresponding to PCT International Application No. PCT/EP2020/070370 filed Jul. 17, 2020.
Jun, Jin:; "Noise reduction and source recognition of partial discharge signals in gas-insulated substation"; pp. 1-268; XP055781252; URL:https://core.ac.uk/download/pdf/48629282.pdf; 2006.
"De-noising of GIS partial discharge signal corrupted with narrowband noise using Shannon wavelet", Yulong Miao et al., 2018 IEEE International Conference on High Voltage Engineering and Application (ICHVE), pp. 1-4, Feb. 14, 2019.
"Analysis of Vibration Signals Based on Information Entropy in Aircraft AC Generator", Jiang Qinlong et al., Computer Measurement & Control, vol. 20, No. 2, pp. 500-502 and 506, Dec. 31, 2012.

* cited by examiner

METHOD FOR PARTIAL DISCHARGE RECOGNITION IN HIGH VOLTAGE APPLICATIONS AND UNIT USING THE METHOD

CROSS REFERENCE TO RELATED APPLICATIONS

This application is the US National Stage of International Application No. PCT/EP2020/070370 filed 17 Jul. 2020, incorporated by reference herein in its entirety.

FIELD OF INVENTION

The present invention relates to a method for partial discharge recognition in high voltage applications and a high voltage unit using the method, comprising the steps detecting a signal, transforming the signal from time to frequency domain, cutting frequencies above a defined threshold, and retransform the truncated signal from frequency to time domain.

BACKGROUND OF INVENTION

Partial discharge is a localized dielectric breakdown of an electrical isolation at high voltages. In high voltage applications, for example in instrument transformers, for voltages in the range of some kilovolt up to more than thousand kilovolt, partial discharge can lead to faults, measuring errors, damages, up to complete demolition of units and break down of the grid. A dielectric break down occurs between conductors across an isolator, particularly a solid isolator like ceramic, silicon and/or non-conducting composite materials, or fluids like oil and/or gas like $SF_6$ or Clean Air, not bridging the complete space between conductors. In fluids like oil, partial discharge can lead to bubbles, but mostly is not visible. In or across solid isolators, partial discharge is normally not visible, till irreversible damage of equipment.

Partial discharge at or in solid isolators starts within voids, cracks, contaminants or inclusions, particularly at conductor-dielectric interfaces, and in liquids partial discharge starts particularly in bubbles, contaminants or inclusions. Since partial discharge is only limited to a portion of isolation, the discharge is only partially bridging the distance between conductors. As the partial discharge is initiated, high frequency transient current pulses will appear and persist for nano- to microseconds. Then the current pulses disappear and reappear repeatedly as a sinewave passes through the zero crossing. Detection and measuring of partial discharges are difficult, complex and cost intensive, due to high voltages and high levels of electrical background noise. Particularly in operation, partial discharges in high voltage applications are difficult to identify and to determine, and damages and/or electrical losses can be tremendous.

Especially to distinguish between noise, for example introduced due to corona signals in substations, crosstalk signals, electromagnetic signals, and other sources, and between partial discharge is difficult, and correct partial discharge measurements on site and online are very complicated, because of the high noise level, which hides real signals. Due to the short duration and due to rise times in nanoseconds of partial discharge currents, a usual way to quantify partial discharge magnitude is in picocoulombs. To investigate partial discharge, intensity is displayed versus time. For example, on an oscilloscope partial discharge appears as evenly spaced burst events at the peak of a sinewave, whereas arcing and sparking occur randomly.

Partial discharge measurements are performed both, for quality assessment and for diagnostic issues. The partial discharge is for example an indicator for the status of the apparatus under test. It is performed for example in factory quality tests, particularly in a faraday cage and with defined energizing supply, or in operation in the grid, with a lot of background noise. Especially for tests and/or online monitoring on high voltage units, for example high voltage switches, bushings, and/or transformers, different methods were evolved. A method is based on Transient Earth Voltages, i.e. induced voltage spikes on the surface of surrounding grounded metalwork.

Further methods to detect and measure partial discharge use ultrasonic sound sensors, ultra-high frequency sensors/antennas, high frequency current transformer sensors, and/or directional couplers. Time domain reflectometry, observing reflected waveforms, particularly displayed in a partial discharge mapping format, enables a spatial location of insulation irregularities. Phase resolved partial discharge patterns, correlating recorded signals and applied voltage, and time frequency maps, using features of a recorded signal to discriminate among different sources, as well as cross-correlation analysis of recorded signals, enable an investigation of partial discharge.

Particularly during on site measurements, described methods above provide only low sensitivity, require cost intensive equipment with high complexity.

SUMMARY OF INVENTION

An object of the present invention is to overcome the problems described above. Especially an object of the present invention is to improve sensitivity of partial discharge recognition and determination, reduce costs by enabling partial discharge measurements with less complex equipment, reducing noise and improving measurement results.

The above objects are achieved by a method for partial discharge recognition in high voltage applications, comprising the steps
   detecting a signal
   transforming the signal from time to frequency domain
   cutting frequencies above a defined threshold
   retransform the truncated signal from frequency to time domain. The information content of detected and truncated signals is determined and compared.

In high voltage applications, to distinguish between noise and partial discharge signals is very difficult. Partial discharge signals are small but comprise information in contrast to pure noise signals. Direct detection, identification and measurement, particularly monitoring of partial discharge signals requires costly, complex equipment and is not always possible in a reliable way. By measuring respectively detecting a signal, transforming the signal to the frequency domain, cutting frequencies above a defined threshold and retransferring the truncated signals from frequency to time domain, and determining and comparing information content of detected and truncated signals, distinguishing between noise and partial discharge is possible, with less measuring effort, more reliability, and with less costs. A partial discharge can be recognized more reliable at appearance, and measures can be initiated, for example a shutdown of units and/or equipment, and/or cutting the electrical connection to the grid, to avoid damages and/or failures. Partial discharge is recognized and determined with improved sensitivity, at reduced costs. The method according to the present invention enables partial discharge measurements with less complex equipment, reducing noise and improving measurement results, by identifying and distinguishing partial discharge and noise by analyzing the information content of signals after cutting off higher frequencies of measured signals above a certain threshold.

The method can comprise, that signals with comparable, particularly equal information content of detected and truncated signal are identified as noise, and/or signals with lower information content of truncated signal compared to detected signal information content are identified as signal including partial discharge information. This allows reliable to distinguish between noise and partial discharge signals, with advantages as described above.

The information content of detected and truncated signals can be calculated and/or comparison of information content can be performed by subtraction and/or division. Subtraction and division are easy to perform, particularly automatically and in short time respectively at the same time with measurements. Determination and/or comparison of information content of detected and/or truncated signals, particularly performed in real time and/or automatically, can be performed with a computer and/or online. A fast and particularly automatic determination and/or comparison of information content allows for example a monitoring with time of partial discharge events and a fast reaction to protect equipment, for example by switching off of electrical lines. Maintenance can be initiated for equipment respectively units which show partial discharge events once and/or more often. A warning signal can be produced and/or transmitted for example on side and/or online via internet or mobile network, or partial discharge events can be monitored online for example via internet over periods of time.

Steps, particularly all steps of the method according to the present invention can be repeated particularly periodically over a fixed time period, to increase reliability of results.

The determination of information content can be performed by a calculation of Shannon entropy. Entropy is a measure of the mean value of information content of the information. An information content of signals can be calculated. Claude Elwood Shannon defined the Entropy of a discrete, memoryless information source respectively discrete random variable H for a determined number of characters z. An information content $I(z)=-\log_2 p_z$ is assigned to every probability p of an event z respectively signal value. The entropy of the character z is defined as the expected value of the information content $H_1=-\Sigma p_z \log_2 p_z$ with probability $p_z$ of character z to occur. Summands with different probabilities do not add to the sum per definition. The entropy of a sign w with length n is $H_n=-\Sigma p_w \log_2 p_w$ with probability $p_w$ of sign w to occur. The probability H is derived as Limes $n \rightarrow \infty$ with $H=\lim(n\rightarrow\infty)Hn/n$.

Noise signals have no information content, since a value of the signals is randomly. Cutting off high frequencies does not change a Shannon entropy, since no information is lost. For partial discharge signals, cutting off frequencies reduces the Shannon entropy, since information content is lost. Comparison of Shannon entropy of signals as measured and Shannon entropy of truncated signals results in same values for pure noise, and lower values of Shannon entropy of truncated signals compared to Shannon entropy of signals as measured for signals comprising partial discharge. The occurrence of partial discharge can be identified, and a value of partial discharge can be calculated, with advantages as described above.

A detected signal can be and/or can comprise a voltage signal and/or a current signal. For example, high frequency transient current and/or voltage pulses can be measured, persisting for nano- to microseconds, disappearing and reappearing repeatedly as a sinewave passes through the zero crossing. There is no need to identify partial discharge pulses within a noisy signal by complex, costly equipment with high resolution. With the method according to the present invention, easy and cost saving equipment can be used to detect and measure partial discharge, even partial discharge signals with magnitude in the range of picocoulombs at high voltages and high levels of electrical background noise. The high voltage can be in the range of more than some kilovolt up to 1200 kV, particularly from 15 kV up to 1200 kV.

With a partial discharge recognized and/or identified, an alarm signal can be produced and/or send, particularly online via internet and/or mobile network. Further steps can be taken to avoid damage and/or destruction of units, for example switching off of high voltage and/or cutting off electrical lines of units to the grid, or staff can be send for inspection and/or maintenance of equipment respectively electrical units, where partial discharge occurred.

A value of partial discharge can be evaluated by an iteration method, deleting signals identified as noise and/or determining a cut off frequency, above which signals are identified as noise.

A high voltage unit according to the present invention, particularly using a method as described above, is or comprises an instrument transformer, a high voltage switch, a surge arrester, a bushing, and/or a medium or high voltage transformer.

The unit can comprise an isolator, particularly an isolator housing with rips on the outer surface.

The unit can be designed for voltages in the range of more than some kilovolt up to 1200 kV.

The advantages in connection with the described high voltage unit according to the present invention, particularly using a method as described above, are similar to the previously, in connection with the method for partial discharge recognition in high voltage applications described advantages.

BRIEF DESCRIPTION OF THE DRAWINGS

The present invention is further described hereinafter with reference to an illustrated embodiment shown in the accompanying drawings, in which.

DETAILED DESCRIPTION OF INVENTION

Figure 1:
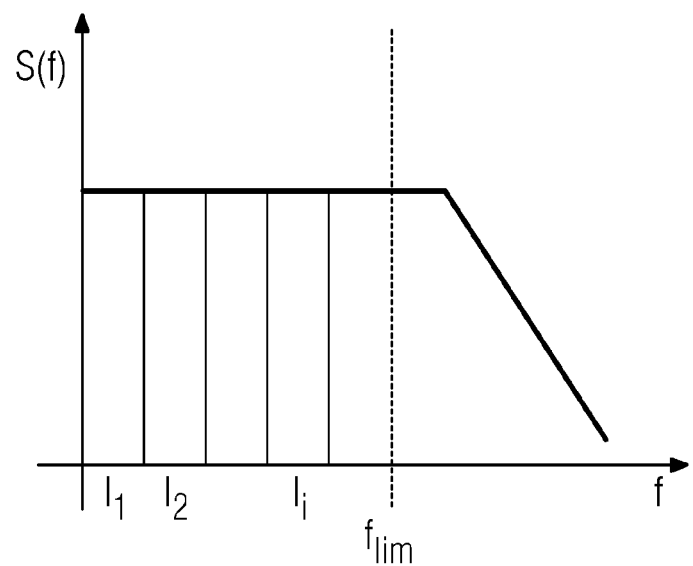
FIG. 1 illustrates schematically a measured signal transformed to the frequency domain, with partial discharge signal.

In FIG. 1 a measured signal of partial discharge, transformed to the frequency domain is shown. The signal is measured for example in form of voltage and/or current with time. An alternating voltage and/or current is introduced by partial discharge events for example between two electrical poles, with isolator in-between, particularly an isolator of a high voltage device respectively application/unit. As described before, the partial discharge signal is small compared to the high voltage between the poles, with high voltage for example in the range of some kilovolt up to 1200 kV, compared to some picocoulomb signals of partial discharge, i.e. small voltage and current signals. Partial discharge occurs for example across the outer surface of a solid isolator. A solid isolator for example consists of or comprises ceramic, silicone and/or composite materials. The isolator is particularly part of a high voltage unit, for example an instrument transformer, switch, bushing, transformer and/or search arrester. The isolator is for example designed in form of a housing and/or mounting structure of the high voltage unit for example in hollow cylindrical form with rips on the outer surface. The partial discharge also occurs for example in fluidic isolators, particularly oil of a high voltage units.

The partial discharge is a localized dielectric breakdown of the electrical isolation at high voltages between the electrical poles. The partial discharge at or in the isolator starts for example within voids, cracks, contaminants or inclusions, particularly at conductor-dielectric interfaces, and in liquids partial discharge starts particularly in bubbles, contaminants and/or inclusions. The partial discharge is only limited to a portion of isolation. The discharge is only partially bridging the distance between the poles respectively between electrical conductors. As the partial discharge is initiated, high frequency transient current pulses appear and persist for nano- to microseconds. Then the current pulses disappear and reappear repeatedly as for example a sinewave passes through the zero crossing. The partial discharge signals are short in duration and exhibit rise times of currents in the range of nanoseconds. High levels of electrical background noise, for example due to corona, crosstalk and other effects, make a correct measurement and simple recognition and determination of partial discharge within a measured signal of high voltage/currents difficult.

The measurements of a signal S, for example current and/or voltage signal, is performed with time. Due to the short duration and due to rise times in the range of nanoseconds of partial discharge currents in high voltage applications, a visualization and distinguishing between noise and partial discharge in voltage/current against time plots is difficult. To identify partial discharge and/or to determine a value of partial discharge, according to the present invention the information content I of a signal S is investigated. Measured signals with time S (t) are transformed from time to frequency domain for example by Fourier Transform and/or Discrete Cousin Transform. Frequencies f above a predefined frequency limit $f_{lim}$ are cut off and truncated signals are obtained, by removing the signal components at frequencies higher than $f_{lim}$. The value of frequency limit $f_{lim}$ is for example defined every time at the beginning of a monitoring activity respectively measurement. In a step after removing frequencies f above a predefined frequency limit $f_{lim}$, signals are transformed back respectively retransformed from frequency to time domain.

Figure 2:
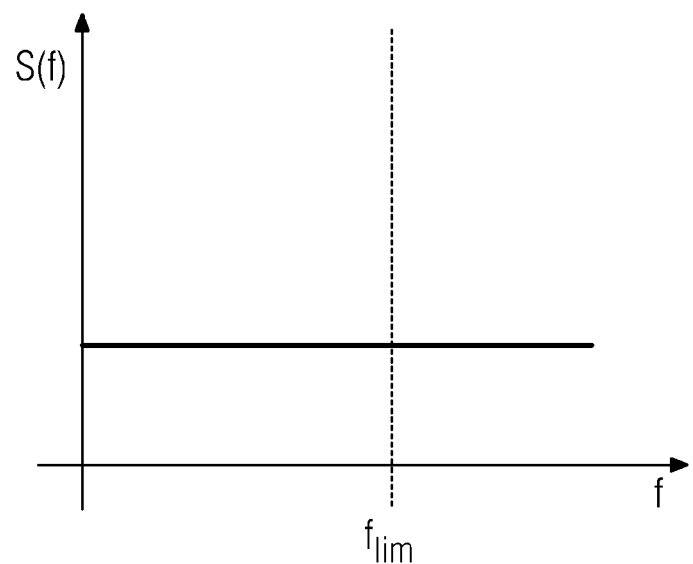
FIG. 2 shows schematically a measured signal transformed to the frequency domain, completely composed of noise.

In FIG. 1 an example of a partial discharge signal S(f) in frequency domain is shown, i.e. after transformation from time domain, where each component of the signal $S(f_i)$ has an information $I_i$. For comparison, FIG. 2 shows a signal $S(f_i)$ completely composed of noise. There, each component $S(f_i)$ has no information, because the signal is completely casual. The signal information I is for example obtained as $$\int_{-\infty}^{+\infty} I_i df = I$$

i.e. by adding the information associated to each component. As seen in FIG. 1 and FIG. 2, partial discharge signals contain an information, while noise signals do not contain information. Noise signals are completely uncorrelated among themselves. By switching from the time domain to the frequency domain, each component has a part of the global information $I_i$. By cutting off parts of the signal above frequency limit $f_{lim}$, information is lost, if the measured signal comprises partial discharge and does not consist only of noise. According to the present invention the method respectively algorithm is to extract the information from the sampled signals, for example by calculating the Shannon entropy, and compare the information content of the sampled signal with the information content of the truncated signal, derived by cutting off frequencies of the signal above frequency limit $f_{lim}$.

The information content of the measured respectively sampled signals is calculated, particularly by a computer locally and/or in the cloud, as described above for example by calculating the Shannon entropy, and the information content of the truncated signal respectively signal after cutting off frequencies is calculated, particularly by a computer locally and/or in the cloud, likewise as described above for example by calculating the Shannon entropy. Both calculations are for example performed in time with measurements or separately one after another, or in a predefined order. After removing frequency components, a time domain signal for the truncated signal is obtained for example by the inverse integral transform, particularly by Fourier Transform and/or Discrete Cousin Transform. The determination of information content of measured and truncated signals is analogous, for example in both cases by calculating the Shannon entropy.

A comparison of information content of the measured and truncated signals results according to the present invention in a recognition and/or determination of partial discharge. A comparison is performed for example manually and/or automatically, for example by a computer and/or in the cloud. Methods to compare signals include for example division and/or subtraction of the information content of the measured and truncated signals. For division a result is $$R = \frac{I_{truncated\ signal}}{I_{original\ signal}} < 1$$

smaller than one, if a measured signal comprises partial discharge. Without partial discharge is $$R = \frac{I_{truncated\ signal}}{I_{original\ signal}} \sim 1$$

a division result, which is exactly or mainly one, since a signal consists only of noise, and no information is lost by cutting off frequencies.

A recognition and/or determination of partial discharge has advantages as described above, for example a warning can be provoked and/or transmitted and further actions triggered, for example switching off voltage and/or disconnecting high voltage units from the grid, to avoid damage and/or destruction/failure of the units. Partial discharge measurements are also providing quality assessment and diagnostic results. The partial discharge is for example an indicator for the status of the apparatus under test. It is performed in factory quality tests, to show proper function of produced units. In operation in the grid, with a lot of background noise, an online monitoring on high voltage units, for example high voltage switches, bushings, and/or transformers, is possible.

A detection of signals is performed for example based on Transient Earth Voltages, i.e. induced voltage spikes on the surface of surrounding grounded metalwork. Further methods to detect and measure partial discharge use ultrasonic sound sensors, ultra-high frequency sensors/antennas, high frequency current transformer sensors, and/or directional couplers.

The above described embodiments of the present invention can be used also in combination and combined with embodiments known from the state of the art. For example, partial discharge can be detected by once performing the steps, particularly all steps as described before. A higher reliability is reached by performing the steps, particularly all steps as described before, repeated. An iteration method to determine partial discharge can include determining a value of frequency limit $f_{lim}$. An iteration method can comprise repeating steps according to the present invention, and changing cut off frequency limit $f_{lim}$, till a change of Shannon entropy occurs and/or no change of Shannon entropy occurs with changed frequency limit $f_{lim}$.

The invention claimed is:

1. A method for partial discharge recognition in high voltage applications, comprising:
    detecting, at a high voltage unit, a signal associated with a partial discharge event;
    transforming, at a computing unit, the detected signal from time domain to frequency domain;
    cutting off frequencies of the detected signal above a defined threshold resulting in a truncated signal;
    retransforming the truncated signal from frequency domain to time domain;
    determining, at a computing unit, an information content of the detected signal and an information content of the truncated signal; and
    comparing the information content of the detected signal and the information content of the truncated signal to determine whether the detected signal includes partial discharge information, wherein the information content of the detected signal and the information content of the truncated signal are determined by a calculation of Shannon entropy.

2. The method of claim 1, wherein:
    when the detected signal and the truncated signal have comparable information content, the detected signal is identified as noise, and
    when the truncated signal has lower information content than the detected signal, the detected signal is identified as a signal including partial discharge information.

3. The method of claim 1,
    wherein the information content of the detected signals and the truncated signals are calculated, and the comparison of information content is performed by subtraction or division.

4. The method of claim 1,
    wherein the comparison of the information content of the detected signal and the truncated signal is performed in real time.

5. The method of claim 1,
    wherein the method steps are repeated over a fixed time period, to increase reliability of results.

6. The method of claim 1,
    wherein the detected signal comprises a voltage signal or a current signal.

7. The method of claim 1, further comprising:
    producing an alarm signal when the detected signal is determined to include partial discharge information.

8. The method of claim 1, further comprising:
    evaluating a value of the partial discharge by an iteration method;
    deleting signals identified as noise.

9. A high voltage unit using a method according to claim 1 for partial discharge recognition, the unit comprising:
    an instrument transformer, a high voltage switch, a surge arrester, a bushing, and/or a medium or high voltage transformer.

10. The high voltage unit according to claim 9,
    wherein the unit comprises an isolator, or an isolator housing with rips on an outer surface.

11. The high voltage unit according to claim 9,
    wherein the unit is designed for voltages in a range of more than a kilovolt up to 1200 kV.

12. The method according to claim 2,
    identifying signals with equal information content of the detected signal and the truncated signal as noise.

13. The method according to claim 4,
    wherein determination and/or comparison of the information content of the detected signals and/or the truncated signals are performed in real time, automatically.

14. The method according to claim 4,
    wherein determination and/or comparison of the information content of the detected signals and/or the truncated signals are performed in real time, automatically, with a computer and/or online.

15. The method according to claim 5,
    wherein the method steps are repeated periodically over a fixed time period, to increase reliability of results.

16. The method according to claim 7,
    wherein the alarm signal is sent online via internet and/or mobile network.

17. The high voltage unit according to claim 9,
    wherein the unit is designed for voltages in a range of 15 kilovolt up to 1200 kV.

18. The method of claim 1, wherein signals above a cut-off frequency are identified as noise.

* * * * *